(12) United States Patent  
Bleiweiss

(10) Patent No.: US 6,704,712 B1  
(45) Date of Patent: Mar. 9, 2004

(54) REMOTE FILM SCANNING AND IMAGE TRANSFER SYSTEM, PROTOCOL AND METHOD

(75) Inventor: Avi Bleiweiss, Sunnyvale, CA (US)

(73) Assignee: Shutterfly, Inc., Redwood City, CA (US)

(*) Notice: Subject to any disclaimer, the term of this patent is extended or adjusted under 35 U.S.C. 154(b) by 0 days.

(21) Appl. No.: 09/550,473

(22) Filed: Apr. 14, 2000

(51) Int. Cl.⁷ .............................................. G06F 17/60
(52) U.S. Cl. ............................ 705/26; 707/3; 707/10; 709/219
(58) Field of Search ................... 705/26, 27; 707/1, 707/3, 10; 709/200, 217, 218, 219, 227

(56) References Cited

U.S. PATENT DOCUMENTS

| 5,179,637 A | 1/1993 | Nardozzi ..................... 395/114 |
| 5,606,365 A | 2/1997 | Maurinus et al. ........... 348/222 |
| 5,696,850 A | 12/1997 | Parulski et al. ............. 382/261 |
| 5,748,194 A | 5/1998 | Chen ........................... 345/427 |
| 5,751,950 A | 5/1998 | Crisan ..................... 395/188.01 |
| 5,760,916 A | 6/1998 | Dellert et al. ............... 358/408 |
| 5,760,917 A * | 6/1998 | Sheridan ..................... 709/218 |
| 5,778,430 A | 7/1998 | Ish et al. ..................... 711/133 |
| 5,787,459 A | 7/1998 | Stallmo et al. ............. 711/112 |
| 5,787,466 A | 7/1998 | Berliner ....................... 711/117 |
| 5,790,708 A | 8/1998 | Delean ........................ 382/276 |
| 5,806,005 A | 9/1998 | Hull et al. ................... 455/566 |
| 5,809,280 A | 9/1998 | Chard et al. ................ 395/487 |
| 5,835,735 A | 11/1998 | Mason et al. ................ 395/287 |
| 5,862,325 A * | 1/1999 | Reed et al. ................... 707/10 |
| 5,890,213 A | 3/1999 | Sokolov ...................... 711/113 |
| 5,903,728 A | 5/1999 | Semenzato ............. 395/200.47 |
| 5,907,640 A | 5/1999 | Delean ........................ 382/276 |
| 5,913,088 A | 6/1999 | Moghadam et al. ........ 396/311 |
| 5,918,213 A | 6/1999 | Bernard et al. ............... 705/26 |
| 5,926,288 A | 7/1999 | Dellert et al. ............... 358/487 |
| 5,933,646 A | 8/1999 | Hendrickson et al. ...... 395/712 |
| 5,960,411 A | 9/1999 | Hartman et al. ............. 705/26 |
| 6,014,691 A * | 1/2000 | Brewer et al. ............... 709/217 |
| 6,017,157 A * | 1/2000 | Garfinkle et al. ............. 705/26 |
| 6,301,586 B1 * | 10/2001 | Yang et al. ................ 707/104.1 |
| 6,332,146 B1 * | 12/2001 | Jebens et al. ............. 707/104.1 |
| 6,353,848 B1 * | 3/2002 | Morris ......................... 709/200 |
| 6,449,639 B1 * | 9/2002 | Blumberg ................... 709/217 |
| 6,510,462 B2 * | 1/2003 | Blumenau ................... 709/224 |
| 6,510,469 B1 * | 1/2003 | Starnes et al. ............... 709/217 |
| 6,571,271 B1 * | 5/2003 | Savitsky et al. ............. 709/200 |
| 6,573,927 B2 * | 6/2003 | Parulski et al. ............... 348/32 |

FOREIGN PATENT DOCUMENTS

| JP | 08-204731 A | * | 8/1996 | ........... H04L/12/40 |
| WO | WO 97/13343 | * | 4/1997 | ......... H04L/12/417 |
| WO | 97/39580 | | 10/1997 | ............ H04N/7/14 |
| WO | 98/36556 | | 8/1998 | ............ H04N/1/32 |

OTHER PUBLICATIONS

"MGI Software, Zoran, Picturevision & Wolf Camera Team to Embed Internet Print Service into Digital Cameras Software", Feb. 2000, Busines Wire.*  
"Thomson Aligns with PhotoAccess.com to Provide New RCA Digital Camera Owners with Internet Photo Processing", Jan. 2000, Business Wire.*  
"PhotoAccess.com Launches New Web Site That Offers Digital Camera Users Photographic Prints With Just a Few Click", Dec. 1999, Business Wire.*

* cited by examiner

Primary Examiner—Bryan J Jaketic  
(74) Attorney, Agent, or Firm—Tran & Associates

(57) ABSTRACT

Devices and methods for transferring and storing digital image data. The present invention provides a system and a method for transferring digital images between a source terminal and a repository system interconnected by a communications medium. For example, in some embodiments, the communications medium includes the internet. In other embodiments, the medium includes wireless transmission of data. In yet other embodiments, a private network is used. Another aspect provides a remote film scanning applications programming interface (API). In some embodiments, the API includes a reel control data structure associated with a particular reel of images.

14 Claims, 4 Drawing Sheets

REMOTE FILM SCANNING AND IMAGE TRANSFER SYSTEM, PROTOCOL AND METHOD

RELATED APPLICATIONS

This invention is related to:

U.S. patent application Ser. No. 09/428,871, entitled "MULTI-TIER DATA STORAGE SYSTEM" filed Oct. 27, 1999, U.S. patent application Ser. No. 09/436,704, entitled "DISTRIBUTING IMAGES TO MULTIPLE RECIPIENTS" filed Oct. 14, 1999, U.S. patent application Ser. No. 09/428,871, entitled "FACILITATING PHOTOGRAPHIC PRINT RE-ORDERING" filed Aug. 31, 1999, U.S. patent application Ser. No. 09/450,804, entitled "IMAGE UPLOADING" filed Nov. 29, 1999, and U.S. patent application Ser. No. 09/550,474, entitled "DIRECT CONNECT IMAGE UPLOAD SYSTEM AND METHOD" filed on even date herewith, which are all assigned to a common assignee, and which are each incorporated herein by reference.

FIELD OF THE INVENTION

This invention relates to the field of data communication and more particularly to a protocol, applications programming interface (API), and method for communicating scanned digital images (for example, images from photographic film) within a protocol that provides additional information regarding the images.

BACKGROUND OF THE INVENTION

The need and demand for transferring image data across a network is rapidly increasing. People have started taking pictures using digital cameras. Processing facilities have begun offering digital scanning services as an optional supplemental service of their conventional film processing operations. For example, a customer can request that digitized versions of their film images be written to a diskette, burned onto a CDROM (compact disk read-only memory), or even e-mailed across the internet or made available on an internet web site for downloading by their friends and relatives.

Recently, a popular service has arrived which accepts digital image data and writes corresponding images onto photographic paper. The resulting prints are superior in many ways to digital images printed on special coated paper using inkjet technology. Further services can provide special borders, image effects and color corrections, mailing to selected recipients, and other value-adding services for the image owner.

Further services are being developed to provide other services for digital images, such as converting conventional images (prints or negatives) into a digital format, archiving image data, internet publishing, and delivery of images.

A large number of data formats have been developed over the years for holding image data, such as JPEG (joint photographic experts group-type compression format), TIFF (tagged image file format), GIF (graphics interchange format), BMP (bit map format), and other formats. Typically, such formats include a compression format and a data structure definition. An aggregation of images could be held in a directory having a plurality of individual, e.g., JPEG images. However, a mere directory of images lacks organization, indexing, image manipulation information, image ownership information, etc.

Digital images are stored on various media, some that are fixed in location (such as hard disks) and others that can be moved or mailed (such as diskettes, DVDs, or CDROMs). Digital images can also be transferred over communications media such as the internet, local networks, or even a USB (universal serial bus) cable connecting a digital camera to a personal computer. Many different and incompatible protocols and structures have been proposed for transferring and storing images, however a single efficient comprehensive mechanism has not existed.

There is thus a need for a remote film scanning (RFS) application programming interface (API), an image transfer standard, a data structure and/or a protocol for transferring sets of digital images.

SUMMARY OF THE INVENTION

The present invention provides apparatus and methods for transferring and storing digital image data.

The present invention provides a system and a method for transferring digital images between a source terminal and a repository system interconnected by a communications medium. For example, in some embodiments, the communications medium includes the internet. In other embodiments, the medium includes wireless transmission of data. In yet other embodiments, a private network is used.

In some embodiments, the method includes sending a first poll request (e.g., a next-reel-poll, also called N_POLL, or a next-and-previous-reel-poll, also called NAP_POLL) across the communications medium from the repository system to the source terminal, acquiring into the source terminal a reel folder, the reel folder having a reel-control data structure and a reel-image data structure, and in response to receipt of the first poll request at the source terminal and if the reel folder is acquired, sending reel folder address information corresponding to the acquired reel folder from the source terminal to the repository system. This method also includes, in response to receipt of the sent reel folder address information at the repository system, sending a reel-control-data-structure-fetch request across the communications medium from the repository system to the source terminal, sending the reel-control data structure of the reel folder from the source terminal to the repository system via the communications medium, sending the reel-image data structure of the reel folder from the source terminal to the repository system via the communications medium, and storing the reel-control data structure and the reel-image data structure in the repository system.

In some embodiments, the invention includes a computer-usable information medium having control information thereon for causing a suitably programmed system to transfer digital images between a source terminal and a repository system interconnected by a communications medium by performing one or more of the above methods when such program is executed on the system.

Another aspect of the present invention provides a remote film scanning applications programming interface (API). In some embodiments, the API includes a reel control data structure associated with a particular reel of images. The reel control structure includes a reel header and a plurality of roll structures. The reel header includes a substantially unique identifying reel number (ReelNumber). Each roll structure includes a mailer identification (MailerId) associated with a physical address of an entity having an interest in images of an associated roll, and a splice code (SpliceCode) identifying a splice location of the roll on the reel.

The present invention also provides a computer-usable communications medium carrying the API. In some embodiments, the medium includes the internet. In some embodiments, the use of HTTPS data transfer is avoided by tracking valid URLs between the source terminal and the repository, thus allowing the use of HTTP-type data transfer.

Another aspect of the present invention provides a remote film scanning system for transferring digital image data on a network. This system includes a network, and means (equivalent to those described herein) for transferring the digital image data between a source terminal and a repository system interconnected by the network in a common applications programming interface.

DESCRIPTION OF PREFERRED EMBODIMENTS

Figure 1:
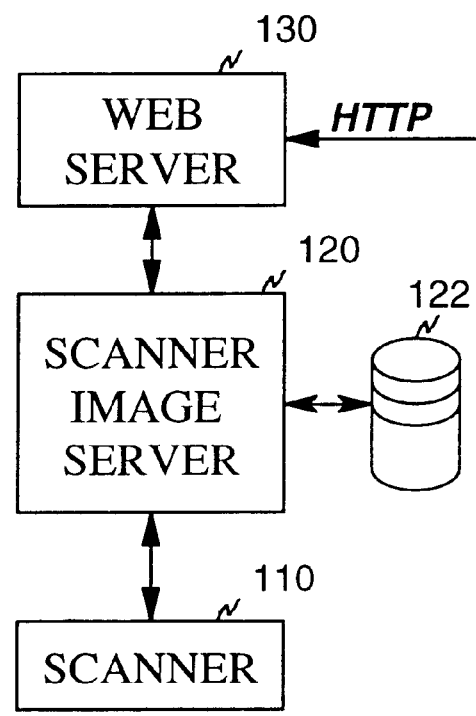
FIG. 1 is a block diagram of a network topology 100 supporting the present invention.
Figure 1:
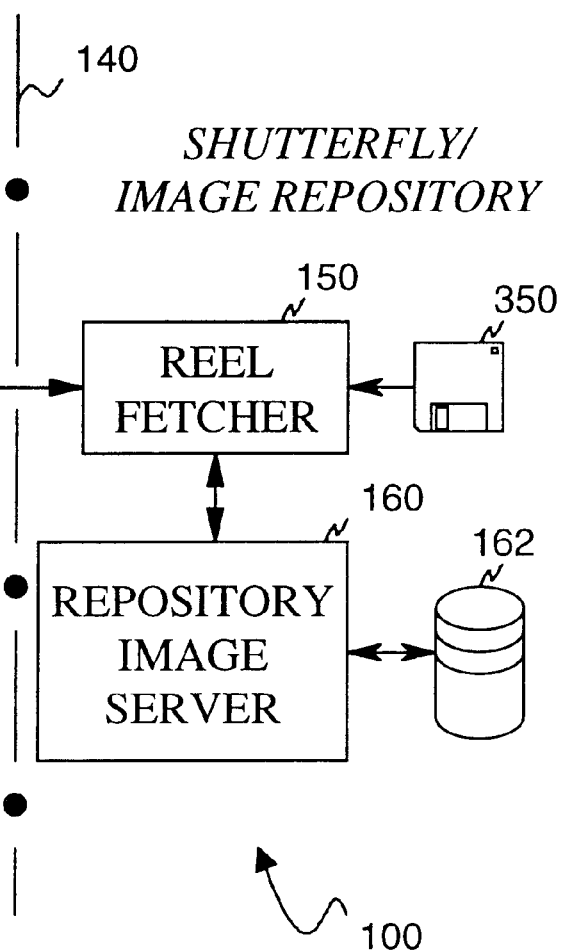

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

In the Figures, the same reference number is used throughout to refer to an identical component which appears in multiple Figures. Signals and connections may be referred to by the same reference number or label, and the actual meaning will be clear from its use in the context of the description.

Shutterfly.com Inc. of Redwood City, Calif. provides a number of services such as accepting digital images submitted over the internet, storing such images in a large data storage repository along with indexing, color-correction, configuration, image-manipulation, and/or ownership information correlated to specific images or groups of images.

The present invention provides an API and data communications protocol for transferring and storing digital images.

The present invention contemplates sources of digital images that, for example, can include a film scanner that scans one or more conventional rolls of photographic negatives or slide film, or a personal computer having a set of stored digital images obtained from, e.g., a digital camera. A roll of conventional photographic film typically includes a plurality of images (e.g., 12, 24, or 36 images are typical, but other numbers of images can be used). Destinations for digital images, for example, can include a central printing facility that exposes conventional light-sensitive color photographic paper to patterns representing the digital image to create photographic prints of the digital images. One exemplary source of digital images is a film-developing-and-scanning facility that accepts consumer film rolls for processing, and that transmits resulting digital images across a network (such as the internet) to the central picture-printing facility. Such a source of digital images can be remote from the central picture-printing facility, and if the remote source is a server connected using an internet protocol, it is called a "remote web server."

The present invention provides a Remote Film Scanning (RFS) applications programming interface (API) and a protocol for transferring digital images from a source to a destination, for example, transferring scanned images from a remote site onto a central repository, such as the Shutterfly repository site. In the discussion below, such exemplary sources and destinations are described, however other embodiments can use other sour and/or destinations, and the data structures described can be used even without performing a network transfer.

In some embodiments, a plurality of rolls (e.g., one hundred rolls) of photographic negative (or slide) film are spliced together to form a "reel" of source images. These reels are then scanned by a high-resolution and high-speed optical scanner to obtain a set of digital images for each reel. Each set of digital images corresponds to a reel of of film. Each digital image in a set of digital images corresponds to a particular image on a particular roll on a particular reel of film. Typically, scanning sessions on the remote site are managed by third-party-vendor software such as Digital Now's Photo Factory system. A central aspect of the Photo Factory system is its Image Server, which communicates with the scanner for image acquisition. According to the preset invention, the resulting digital images are organized into a data structure that facilitates organization, identification, transmittal, collection, and storage of the images into a central repository for later processing.

On the central repository end, a reel fetcher software application is provided to pull available images from a designated remote web server. The reel fetcher acts as an upload gateway, which facilitates a conversion of conventional hypertext transfer protocol (HTTP) to a central repository internal protocol.

FIG. 1 is a diagram that depicts (at a fairly high level) the interaction of the various components mentioned above. The components illustrated are presented in a logical sense and not necessarily in the physical one. System 100 includes a remote site/source terminal (130, 122, 120, 110); also called the server side of source terminal 130. System 100 also includes client side reel fetcher (150, 160, 162). The server side uploads digital images across a network 140, for example, using hypertext transfer protocol (HTTP). This is used in order to scan film at one or more remote sites, each remote site having a source terminal or web server 130; each remote site scanning film negatives from scanner 110 into scanner images server 120, the images being temporarily stored in storage disks 122. These digital images are uploaded, for example, across the internet to a central repository using reel fetcher 150 and disk storage 162. A user may then view the stored images across the internet and order prints that will be mailed to her or him.

Upload Protocol

Figure 3:
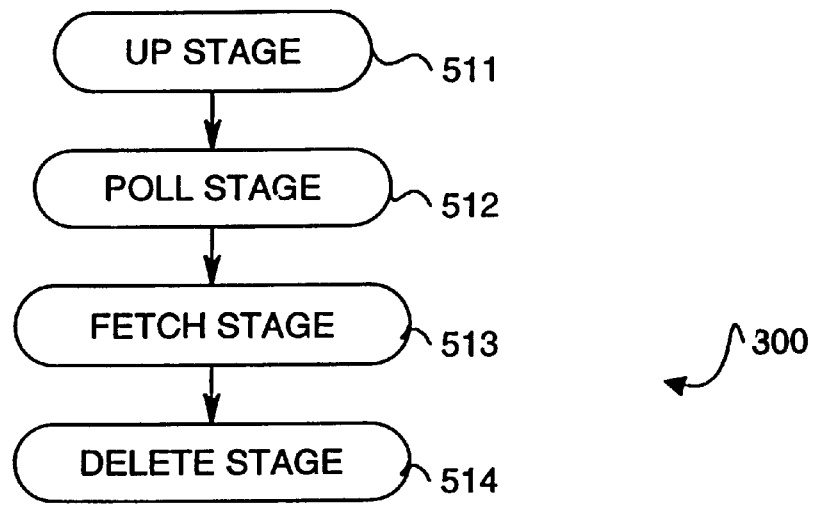
FIG. 3 is a block diagram of an upload protocol 300.

In some embodiments (See FIG. 3), the upload protocol 300 includes an up stage 511, a poll stage 512, a fetch stage 513 and a delete stage 514, each initiated across the internet by the reel fetcher on the Shutterfly site.

The up stage 511 (also called an up protocol) is used to query the state of the Web server service. The server is expected to return a valid id and a valid IP address to indicate service is up. The up protocol is commenced by the reel fetcher frequently and serves as a heartbeat check.

The poll stage 512 is there to query the remote Web server (source terminal 130) continuously for available reel worth of image data. A successful poll is considered once the remote server-returns a URL pointing to a valid reel folder on the Web server. The returned response from the Web server 130 to a client poll query protocol (i.e., from the reel fetcher 150) is either a next reel or a no reel xml-type message. In some embodiments, a next-reel message embeds a servlet software-version token, which is checked for matching on the client side. A next reel message commences a client fetch, initiated by reel fetcher 150.

Figure 2:
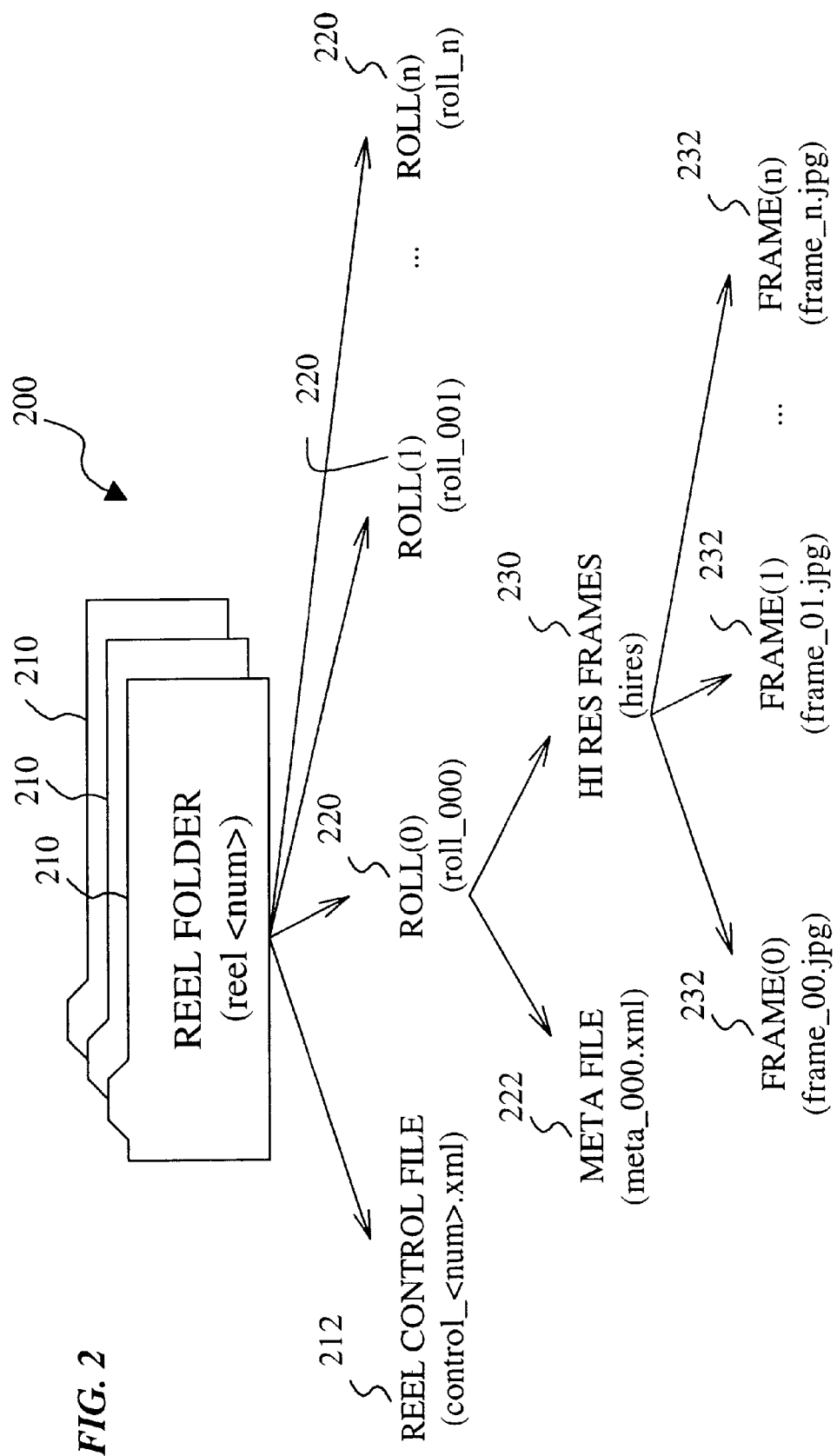
FIG. 2 is a block diagram of a reel-folder data structure 200.

The fetch stage 513 expects the reel URL to point to a root folder with the substructure diagramed in FIG. 2. The fetch stage is further described below.

The delete stage 514 includes a message from the reel fetcher 150 to the source terminal 130 that the source terminal 130 may now delete the reel folder 210, This is generally because the upload has completed, so the reel fetcher 150 has the indicated reel folder 210 and the source terminal may now delete it. Thus, upon successful completion of a reel folder fetch, the reel fetcher will invoke the delete protocol 514. Here, the reel folder URL is passed back to the source terminal 130 (e.g., web server) for it to clean up files and folders as prescribed in the directory structure of FIG. 2. The source terminal 130 responds with a message indicating either a successful or an unsuccessful delete operation. For the latter, the reel fetcher 150 will retry invoke the delete protocol 514 until successful, or if too many attempts indicate failure, it will record an error.

FIG. 2 is a block diagram of a reel-folder data structure 200. Reel-folder data structure 200 includes one or more reel folders 210. In some embodiments, each reel folder 210 is uniquely identified by a URL (an internet universal resource locator address) that points to the directory of the reel folder 210. Each reel folder 210 includes a reel control file 212 and one or more rolls 220. In some embodiments, each roll 220 has a name unique within its reel (for example, roll__000, roll__001, . . . roll__n). In some embodiments, about one hundred rolls 210 are on each reel 210. Each roll 220 includes a meta-data file 222, and one or more high-resolution frames 230 having individual frames 232 (for example, each frame 232 being a JPEG image file).

Figure 5:
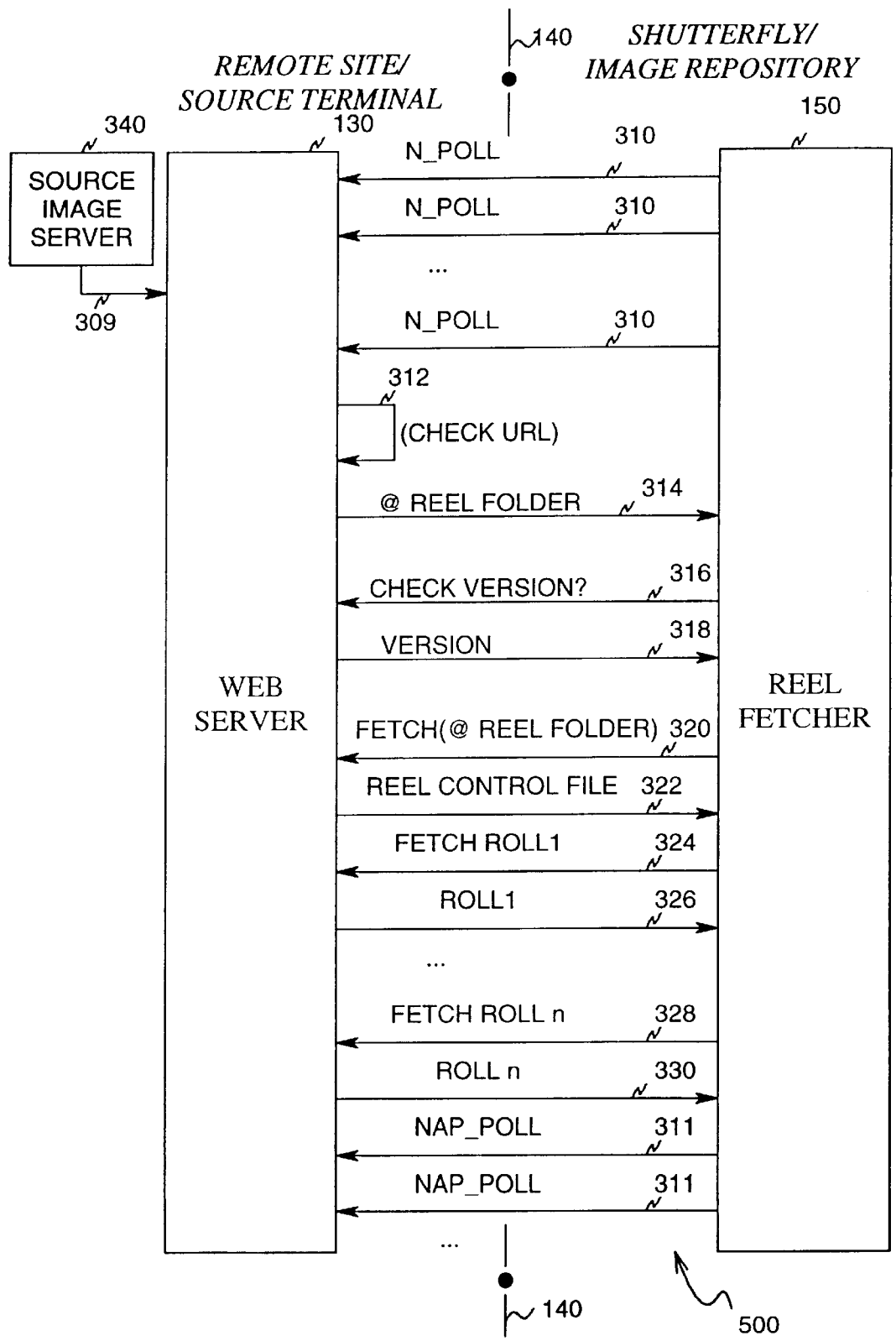
FIG. 5 is a block diagram of a communications protocol 500.

FIG. 5 is a block diagram of another upload communications protocol 500. The upload protocol 500 is composed of a poll stage, an optional version stage and a fetch stage or fetch-delete stage. In one embodiment, reel fetcher 150 on the central repository site initiates each stage.

The poll stage (for example, one or more polls 310 or 311, a check 312 of the fetcher URL against a list of allowed fetcher URLs, and a return 314 of the URL of the reel folder 210) is there for the central repository to query the remote web server periodically to determine whether there is an available reel folder having a reel's worth of image data. A poll is considered "successful" once the remote web server returns a reel URL (universal resource locator) pointing to a reel folder on the remote web server. The reel-folder handler then enters the fetch stage. There are two types of poll protocol. The next-reel-poll (N__POLL) protocol 310 only queries for the next reel folder available. The next-and-previous-reel-poll (NAP__POLL) protocol 311 indicates that the previous reel folder has been successfully fetched (and its data can be safely removed off the remote web server) and that the central repository awaits a new reel folder. In some embodiments, the N__POLL 310 or NAP__POLL 311 includes the URL of the reel fetcher (given in order to route the response back to the reel fetcher 150), and operation 312 performs a check of the URL given against a list of acceptable URLs stored in the source terminal 130, in order to prevent unauthorized access to the images of the source terminal web server 130. In other embodiments, source terminal 130 is locally attached (i.e., using a direct connect network, rather than the internet) to reel fetcher 150, so no URL check 312 is needed.

In some embodiments, a version stage is provided to check and confirm a software version match between the source side (e.g., the remote web server) and the reel fetcher side (e.g., the central repository). In some embodiments, the version stage includes a version query 316 from the reel fetcher 150 and a version response 318 from the source terminal 130, telling the reel fetcher which version of software is running on source terminal 130. In some embodiments, if an obsolete version is running, the reel fetcher will download the correct level of software. Some other embodiments use a version stage at some initial communications point in time between a destination and source, and then track the version so that if and when a software version changes at one end or the other, the ends will perform a version stage to again check and confirm their software version match. In some embodiments, the version stage takes place subsequent to a successful poll stage. The version stage might seem redundant to be carried out for every reel. However, the version stage has a fairly short duration compared to the fetch stage and can be otherwise difficult to schedule as a consistent, less-frequent event.

The fetch stage expects the reel URL returned at 314 to point to a root folder 210 with the substructure diagramed in FIG. 2.

In one embodiment, the following diagram notation is used in FIG. 2:

Each node includes two lines of text. The first line indicates logical description, and the second reflects actual folder/file name.

Numeric index associated with folder/file names:
  6 digits reel number
  3 digits roll number
  2 digits frame number Reel control file (xml) format is specified in Table A.

Roll meta fife format is specified in Table B1 or Table B2.

Frame files are the high-resolution image date, JPEG compressed, 8 (or 12) bits RGB per pixel.

In some embodiments, the reel fetcher will traverse the reel-directory-tree structure depicted above based on the root reel URL supplied by the remote web server. The fetch is performed in a prescribed order. In one embodiment, a fetch message 320 is sent. The reel control file is pulled first at message 322 and parsed by the reel fetcher 150 to identify number of roll folders expected. Then, roll data is fetched on a per-roll basis (fetch message 324 sent by reel fetcher 150, roll 1 data 326 returned, . . . fetch message 328 sent by reel fetcher 150, roll n data 330 returned), wherein the meta-data file is fetched first to indicate number of image frames per folder, followed by the high-resolution image data. In some embodiments, a separate fetch message is sent to obtain the roll meta-data file, then separate fetch messages (not shown) are sent for each image.

The completion of a reel traversal fetch is signified by a NAP__POLL protocol 311. NAP__POLL 311 also acts as a poll for a subsequent roll.

Security

In some embodiments, to address the security aspect of accessing the remote web server, a list or range of IP (internet protocol) addresses owned by the central repository is provided. The range of TP addresses constrains sessions to the central repository solely and helps avoid any unauthorized or unintended access. Also, this method alleviates the need for using HTTPS (secure-socket HTTP) protocol for authentication, and simplifies the protocol for poll and fetch to conventional HTTP.

Image data

In some embodiments, the upload of image data from the remote web server on to the central repository site is limited to the high-resolution images. The image format is JPEG with either 8 or 12 bits per red, green, or blue component of each RGB pixels. The resolution of the image captured varies from roll to roll, and is scanner specific. The quality level of JPEG compression is set to trade off image quality with storage space and upload efficiency. In some embodiments, the central repository favors quality over space and speed and requires a JPEG quality level of 85 or better. A scanner limited to the 1.5 to 2.5 MPixels (megapixels) area is anticipated to produce a 0.5 to 0.75 MB JPEG image size.

Images on the remote side are expected to be compressed only once to avoid loss of image data.

Upload Methodology

Upload traffic needs to be bound with the physical network infrastructure on both the central-repository-destination end and the remote-source end. Assuming a T1 port to deliver 1.5 megabits per second (Mb/sec), a 0.75 megabyte (MB) image file will get uploaded in about 4 seconds. This throughput provides approximately 900 images per hour, or 21,600 images per day, or 720 rolls a day (assuming 30 frames per roll) per T1 port provided. In some embodiments, higher-speed ports are used. Thus, this basic figure can be scaled based on the number of T1 ports provided at each remote web server, the number of scanners and film processing stations run in parallel, and the scanning speeds and the film processing speeds used.

In general, the intent for the reel fetcher is to continuously poll for reel data on the remote web server and performs upload once data is available. Obviously, the above rates are optimal and may degrade due to network conditions or other conditions that may require retry operations.

The central repository reel fetcher expects an xml type control file, which describes the contents of a reel's worth of film rolls. The file includes a reel header and per-roll identifier data. The latter provides the mapping from a scanned roll of film into a user id, properly registered on the central repository site. The following template of Table A depicts the format of the reel control file. Note: the real xml file has embedded DTD elements for validation purposes. The central repository will provide a complete xml template file for implementation consistency on the remote side.

In some embodiments, the reel fetcher 150 communicates with numerous provider-side source terminals 130. Each provider-side has a substantially unique provider ID and provider password, for example, as shown in the Table A header. A SpliceCode identifier is an identifier for a roll. For remote scanners, this SpliceCode is a "don't care" and can be ignored. On the other hand, when the source terminal 130 is locally connected to reel fetcher 150, the SpliceCode (e.g., a bar code uniquely identifying a roll of film) is attached to each digitized roll of images, and is used to look up a MailerId (which is used to hold the mailing address of the customer associated with that roll of film), based on the SpliceCode. Both are then uploaded to the reel fetcher 150.

TABLE A

Reel Control File Format

```
<?xml version="1.0"?>
<ReelControl>
// generic header data
<Header>
<Comment> Partner to the Central Repository Film Scanning </comment>
<Date> . . . </Date>
<ProviderId> . . . </ProviderId>
<ProviderPswd> . . . </ProviderPswd>
<ScannerType> . . . </ScannerType>
<ReelNumber> . . . </ReelNumber>
</Header>
// reel data, two items per roll/user
<Reel>
<Roll>
<MailerId> . . . </MailerId> (e.g., 13 digits code)
<SpliceCode> . . . </SpliceCode> (e.g., 6 digits code)
</Roll>
. . .
<Roll>
<MailerId> . . . </MailerId>
<SpliceCode> . . . </SpliceCode>
</Roll>
</Reel>
</ReelControl>
```

Note: the format of the reel control file presented is generic. In certain embodiments, some parameters are considered optional to be filled in (e.g., splice code).

The roll meta file is primarily there to indicate number of frames per roll, film type, splice code and exposure time per frame. The roll meta file is equivalent to the header information provided by digital cameras. In some embodiments, the file is xml type with the following format of Table B1. Note: the real xml file has embedded DTD elements for validation purposes. The central repository will provide a complete xml template file for implementation consistency on the remote side.

TABLE B1

Roll Meta File Format 1

```
<?xml version="1.0"?>
<RollMeta>
// generic header data
<Header>
<Comment> Roll Number 000 </Comment>
<SpliceCode> . . . </SpliceCode>
<NumFrames> . . . </NumFrames>
<FilmType> . . . </FilmType> (e.g. NEG, DIA)
<FilmDX> . . . </FilmDX> (e.g. 115-14, indicates vendor, 35 mm vs. APS, sensitivity)
</Header>
<Roll>
<Frame>
```

TABLE B1-continued

Roll Meta File Format 1

```
<FrameIndex> . . . </FrameIndex> (e.g. 00, 01, . . . )
<FrameExpose> . . . </FrameExpose> (e.g. in milliseconds)
<APSFormat> . . . </APSFormat> (e.g. CLASSIC, HDTV, PANORAMIC)
</Frame>
.
.
.
<Frame>
<FrameIndex> . . . </FrameIndex>
<FrameExpose> . . . </FrameExpose>
<APSFormat> . . . </APSFormat>
</Frame>
</Roll>
</RollMeta>
```

In some other embodiments, the file is also of xml type, but with the following format of Table B2. The APSFormat is an indication provided by APS-type cameras of which one of the plurality of aspect ratios of the camera was chosen by the user when the photograph was taken. The image processor then chooses a portion of the image data, crops to that portion, and prints an image matching the selected (i.e., cropped) aspect ratio.

The FilmType identifier identifies whether the film is negative or positive film, for example. The FilmDX identifies a subtype of film, for example, the vendor identification, whether the film is 35 mm or Advanced Photography System (APS), sensitivity, and/or other attributes.

TABLE B2

Roll Meta File Format 2

```
<?xml version="1.0"?>
<RollMeta>
// generic header data
<Header>
<Comment> Roll Number 000 </Comment>
<NumFrames> . . . </NumFrames>
<FilmType> . . . </FilmType> (e.g., NEG, DIA)
<FimDX> . . . </FilmDX> (e.g., 115-14, indicates vendor, 35 mm vs.
APS, sensitivity)
</Header>
<Roll>
<Frame>
<FrameIndex> . . . </FrameIndex> (e.g., 00, 01, . . . )
<FrameExpose> . . . </FrameExpose> (e.g., in milliseconds)
</Frame>
. . .
<Frame>
<FrameIndex> . . . </FrameIndex>
<FrameExpose> . . . </FrameExpose>
</Frame>
</Roll>
</RollMeta>
```

Figure 4:
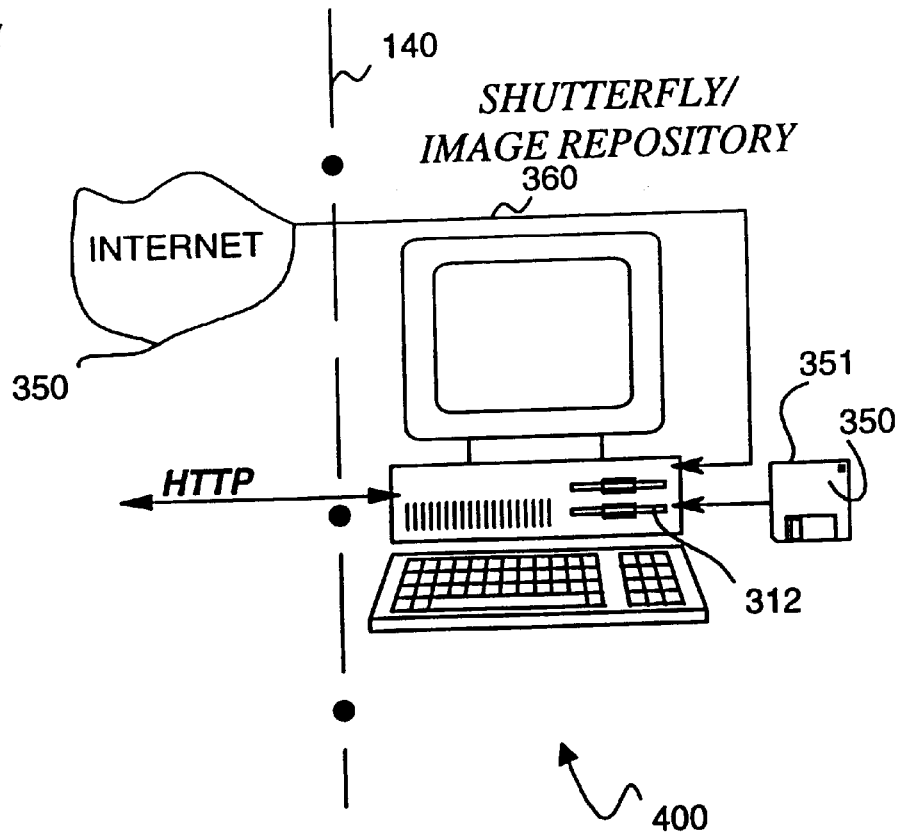
FIG. 4 is a block diagram of a computer system 400.

FIG. 4 is a block diagram of a computer system 400. A computer system 400 is used at the source terminal to run a program 350 to control the acquisition of image data and the upload responses, and another computer 400 is used at the reel-fetcher end run another program 350 (which is complementary to the program 350 of the source terminal, but both of which operate on either protocol 300 or 500, and data structure 200 as described above) to control the polling and storage of the images in the repository. In one embodiment of the present invention, computer 400 is a system that includes removable-media drive 312 (such as a floppy-disk drive, or a ZIP-type high-capacity drive available from IOMEGA Corporation of Roy, Utah, or a CDROM drive). In one embodiment, removable-media drive 312 is used to read program code 350 from program media 351. Media 351 (such as a floppy disk, a ZIP-type cartridge, or a CDROM) is suitable for a corresponding removable media drive 312. In some embodiments, program code 350 is transferred from a communications medium 360 such as the internet. In some embodiments, program media 351 is used to distribute program code 350 to customers. In other embodiments, computer 400 is connected to computer network 360 (such as a local-area network (LAN), or a wide-area network such as the internet). In such a network environment, program code 350 is read from or written to computer network 360. In one such embodiment, computer network 360 is the media used to distribute program code 350 to customers. In some embodiments, program code 350 includes code to load the appropriate reel data image structures 200 to the repository 162.

Conclusion

The present invention provides a system and a method for transferring digital images between a source terminal and a repository system interconnected by a communications medium. For example, in some embodiments, the communications medium 140 includes the internet. In other embodiments, the medium 140 includes wireless transmission of data. In yet other embodiments, a private network 140 is used.

In some embodiments, the method includes sending a first poll request across the communications medium from the repository system to the source terminal, producing a reel folder in the source terminal, the reel folder having a data structure having data associated with a digital image, and sending the data structure in the reel folder to the repository system via the communication medium.

In some embodiments of the method the data associated with the image includes one or more items selected from:
  one or more sets of image data, each set of image data representing images of a roll of film (for example, a plurality of JPEG-format digital images),
  one or more meta data structures, each meta data structure containing control data descriptive of one set of image data (for example, the data structure of Table B1 or Table B2), and
  a control structure that describes the one or more sets of image data (for example, the data structure of Table A).

In some embodiments, the method includes sending a first poll request (e.g., a next-reel-poll 310, also called N_POLL 310, or a next-and-previous-reel-poll 311, also called NAP_POLL 311) across the communications medium 140 from the repository system 150 to the source terminal 130, acquiring into the source terminal a reel folder 210, the reel folder 210 having a reel-control data structure 212 and a reel-image data structure 220, and in response to receipt of the first poll request 310 at the source terminal 130 and if the reel folder is acquired 309, sending reel folder address information 314 corresponding to the acquired reel folder 210 from the source terminal 130 to the repository system 150. This method also includes, in response to receipt of the sent reel folder address information at the repository system, sending a reel-control-data-structure-fetch request 320 across the communications medium from the repository system to the source terminal, sending 322 the reel-control data structure 212 of the reel folder 210 from the source terminal 130 to the repository system 150 via the communications medium 140, sending 326 the reel-image data structure 220 of the reel folder 210 from the source terminal 130 to the repository system 150 via the communications medium 140, and storing the reel-control data structure and the reel-image data structure in the repository system 162.

Some embodiments of the method further include, in response to the storing, sending from the repository system to the source terminal via the communications medium a second poll request (e.g., a next-and-previous-reel-poll 311, also called NAP_POLL 311) that provides acknowledgment of the receipt of the reel-control data structure and the reel-image data structure, and after receipt of the second poll request at the source terminal, deleting the reel folder at the source terminal.

Some embodiments of the method further include, in response to the storing, sending from the repository system to the source terminal via the communications medium an acknowledgment of the receipt of the reel-control data structure and the reel-image data structure from the repository system to the source terminal via the communications medium, and after receipt of the acknowledgment at the source terminal, deleting the reel folder at the source terminal.

Some embodiments of the method further include providing, to the source terminal, a list of one or more valid URLs associated with the repository system, and comparing 312, in the source terminal, a URL associated with the first poll request to the list of one or more valid URLs, and further conditioning the sending of reel folder address information based on the results of this comparing.

Some embodiments of the method further include conditioning the sending of the reel-control data structure based on the results of this comparing.

Some embodiments of the method further include conditioning the sending of the reel-image data structure based on the results of this comparing.

In some embodiments of the method, the reel control structure 212 includes a reel header and a plurality of roll structures, the reel header including a substantially unique identifying reel number (ReelNumber), each roll structure including a mailer identification (MailerId) associated with a physical address of an entity having an interest in images of an associated roll, and a splice code (SpliceCode) identifying a splice location of the roll on the reel.

In some embodiments of the method, the reel-image data structure 220 includes a roll meta file data structure 222 associated with a particular roll, the roll meta file data structure including a roll header and a plurality of frame structures, the roll header including a substantially unique identifying roll number (RollNumber) and a value identifying a number of frames included on the roll, and each frame structure including a frame identification (FrameIndex) of the frame, and an exposure code (FrameExpose) identifying an exposure time of the frame.

In some embodiments, the invention includes a computer-usable information medium having control information thereon for causing a suitably programmed system to transfer digital images between a source terminal and a repository system interconnected by a communications medium by performing one or more of the above methods when such program is executed on the system.

Another aspect of the present invention provides a remote film scanning applications programming interface (API). In some embodiments, the API includes a reel control data structure 212 associated with a particular reel of images. The reel control structure includes a reel header and a plurality of roll structures. The reel header includes a substantially unique identifying reel number (ReelNumber). Each roll structure includes a mailer identification (MailerId) associated with a physical address of an entity having an interest in images of an associated roll, and a splice code (SpliceCode) identifying a splice location of the roll on the reel.

In some embodiments of the API, the reel header further includes a substantially unique partner identifier (ProviderId) that identifies a source terminal entity.

In some embodiments of the API, the reel header further includes a substantially unique partner password (ProviderPswd) that further identifies the source terminal entity.

In some embodiments of the API, the reel control data structure has an xml format as shown in Table A above.

Some embodiments of the API further include a roll meta file data structure 222 associated with a particular roll. The roll meta file data structure includes a roll header and a plurality of frame structures. The roll header includes a substantially unique identifying roll number (RollNumber) and a value identifying a number of frames included on the roll. Each frame structure includes a frame identification (FrameIndex) of the frame, and an exposure code. (FrameExpose) identifying an exposure time of the frame.

In some embodiments of the API, the roll header further includes a film-type identifier (FilmType) that identifies a type of film including whether the film is a negative.

In some embodiments of the API, the roll header further includes a film-dx identifier (FilmDX) that identifies a vendor, size and sensitivity of the film.

In some embodiments of the API, the roll meta file data structure has an xml format as shown in Table B above.

The present invention also provides a computer-usable communications medium carrying control information thereon for causing a suitably programmed system to transfer digital images between a source terminal and a repository system interconnected by the communications medium by transmitting one or more of the APIs described above when such control information is carried on the medium. In some embodiments, the medium includes the internet. In some embodiments, the use of HTTPS data transfer is avoided by tracking valid URLs between the source terminal and the repository, thus allowing the use of HTTP-type data transfer.

Another aspect of the present invention provides a remote film scanning system 100 for transferring digital image data on a network. This system includes a network 140, and means (equivalent to those described herein) for transferring the digital image data between a source terminal and a repository system interconnected by the network in a common applications programming interface.

Yet another aspect of the present invention provides a computer-implemented method of business, useful, for instance, in providing improved customer service and versitility in film processing and print delivery. This method includes accepting undeveloped film at a first business entity, and processing and digitally scanning images of the film at the first business entity. The method also includes transferring the digital scanned images to a second business entity across a communications medium (for example, the internet, a dedicated telecommunications fiber or cable, or even wireless transmissions), storing the scanned digital images at the second business entity, processing prints of the stored images, and delivering the prints to a customer. In some embodiments, the communications medium includes, for example, the internet, a dedicated telecommunications fiber or cable, or even wireless transmissions. In some embodiments, the processing prints includes exposing photographic paper to light patterns representing the images to be printed, and developing the paper. In some embodiments, the reel data structure and/or the roll data structure includes a mailing address of the customer to whom the prints are to be delivered, and the developed paper prints include a "top" print that includes the mailing address, thumbnail-type versions of the other prints, and/or a postage imprint, such that the stack of prints with the top print can be shrink-wrapped in clear plastic film, and directly mailed to the customer.

In some embodiments, the business method further includes sending a first poll request across the communications medium from the second business entity to the first business entity, producing a reel folder in the first business entity, the reel folder having a data structure having data representing the digital scanned images, and sending the data structure in the reel folder to the second business entity via the communication medium.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. The terms "comprising" and "including" each indicate inclusive groups of elements or steps, and are not intended to exclude other components, integers or steps.

What is claimed is:

1. A method of transferring digital images between a source terminal and a repository system interconnected by a communications medium, comprising:

sending a first poll request across the communications medium from the repository system to the source terminal;

producing a reel folder in the source terminal, the reel folder having a data structure having data associated with a digital image;

sending the data structure in the reel folder to the repository system via the communication medium, wherein the reel folder includes a reel-control data structure and a plurality of roll data structures, in response to receipt of the first poll request at the source terminal and if the reel folder is available, sending reel folder address information corresponding to the available reel folder from the source terminal to the repository system via the communications medium;

in response to receipt of the sent reel folder address information at the repository system, sending a reel-control-data-structure-fetch request across the communications medium from the repository system to the source terminal;

sending the reel-control data structure of the reel folder from the source terminal to the repository system via the communications medium;

sending a reel-image data structure of the reel folder from the source terminal to the repository system via the communications medium; and storing the reel-control data structure and the reel-image data structure in the repository system.

2. The method of claim 1, further comprising:

in response to the storing, sending from the repository system to the source terminal via the communications medium a second poll request that provides acknowledgment of the receipt of the reel-control data structure and the reel-image data structure; and after receipt of the second poll request at the source terminal, deleting the reel folder at the source terminal.

3. The method of claim 1, wherein the reel control structure comprises a reel header and a plurality of roll structures, the reel header including a substantially unique identifying reel number (ReelNumber), each roll structure including a mailer identification (MailerId) associated with a physical address of an entity having an interest in images of an associated roll, and a splice code (SpliceCode) identifying a splice location of the roll on the reel.

4. The method of claim 3, wherein the reel-image data structure comprises a roll meta file data structure associated with a particular roll, the roll meta file data structure including a roll header and a plurality of frame structures, the roll header including a substantially unique identifying roll number (RollNumber) and a value identifying a number of frames included on the roll, and each frame structure including a frame identification (FrameIndex) of the frame, and an exposure code (FrameExpose) identifying an exposure time of the frame.

5. The method of claim 1, wherein the data associated with the image includes one or more items selected from:

one or more sets of image data, each set of image data representing images of a roll of film;

one or more meta data structures, each meta data structure containing control data descriptive of one set of image data; and a control structure that describes the one or more sets of image data.

6. A method of transferring digital images between a source terminal and a repository system interconnected by a communications medium, comprising:

sending a first poll request across the communications medium from the repository system to the source terminal;

producing a reel folder in the source terminal, the reel folder having a data structure having data associated with a digital image; and sending the data structure in the reel folder to the repository system via the communication medium;

providing, to the source terminal, a list of one or more valid URLs associated with the repository system; and comparing, in the source terminal, a URL associated with the first poll request to the list of one or more valid URLs, and further conditioning the sending of reel folder address information based on the results of this comparing.

7. A method of transferring digital images between a source terminal and a repository system interconnected by a communications medium, comprising;

sending a first poll request across the communications medium from the repository system to the source terminal;

producing a reel folder in the source terminal, the reel folder having a data structure having data associated with a digital image; and sending the data structure in the reel folder to the repository system via the communication medium;

providing, to the source terminal, a list of one or more valid URLs associated with the repository system; and comparing, in the source terminal, a URL associated with the first poll request to the list of one or more valid URLs, and conditioning the sending of a reel control data structure based on the results of this comparing.

8. A method of transferring digital images between a source terminal and a repository system interconnected by a communications medium, comprising:

sending a first poll request across the communications medium from the repository system to the source terminal;

producing a reel folder in the source terminal, the reel folder having a data structure having data associated with a digital image; and sending the data structure in the reel folder to the repository system via the communication medium;

providing, to the source terminal, a list of one or more valid URLs associated with the repository system; and comparing, in the source terminal, a URL associated with the first poll request to the list of one or more valid URLs, and conditioning the sending of a reel image data structure based on the results of this comparing.

9. A method of transferring digital images between a source terminal and a repository system interconnected by a communications medium, comprising:

sending a first poll request across the communications medium from the repository system to the source terminal;

producing a reel folder in the source terminal, the reel folder having a data structure having data associated with a digital image;

responding to the first poll from the source terminal to the repository system indicating that the reel folder is available;

sending a first fetch request across the communications medium from the repository system to the source terminal; and sending the data structure in the reel folder to the repository system via the communication medium.

10. A computer-usable information medium having a computer program stored thereon for causing a suitably programmed system to transfer digital images between a source terminal and a repository system interconnected by a communications medium by performing the method of claim 9, when such program is executed on the system.

11. The method according to claim 9, further comprising:

sending an up request across the communications medium from the repository to determine whether the communications medium is in a condition to communicate between the repository system and the source terminal.

12. The method according to claim 9, further comprising:

sending a delete request across the communications medium from the repository to the source terminal to indicate that the reel folder is allowed to be deleted.

13. The method according to claim 9, further comprising:

sending a version tag across the communications medium from the repository to the source terminal to indicate a software version.

14. The method according to claim 9, further comprising:

sending a version tag across the communications medium from the source terminal to the repository to indicate a software version.

* * * * *